United States Patent [19]

Inoue

[11] Patent Number: 5,673,569

[45] Date of Patent: Oct. 7, 1997

[54] DOUBLE EFFECT ABSORPTION COLD OR HOT WATER GENERATING MACHINE

[75] Inventor: Naoyuki Inoue, Kanagawa-ken, Japan

[73] Assignee: Ebara Corporation, Tokyo, Japan

[21] Appl. No.: 541,000

[22] Filed: Oct. 11, 1995

[30] Foreign Application Priority Data

Oct. 18, 1994 [JP] Japan .................................. 6-277241

[51] Int. Cl.⁶ .................................................. F25B 15/00
[52] U.S. Cl. ............................................. 62/324.2; 62/148
[58] Field of Search ............................. 62/148, 324.2, 62/476, 105

[56] References Cited

U.S. PATENT DOCUMENTS

| | | | |
|---|---|---|---|
| 5,282,369 | 2/1994 | Ohuchi et al. | 62/476 |
| 5,295,371 | 3/1994 | Oonou et al. | 62/476 |
| 5,363,668 | 11/1994 | Nakao et al. | 62/141 |
| 5,373,709 | 12/1994 | Tongu et al. | 62/476 |

FOREIGN PATENT DOCUMENTS 54-182458   12/1979   Japan .
64-14562    1/1989    Japan .

*Primary Examiner*—William Doerrler
*Attorney, Agent, or Firm*—Armstrong, Westerman, Hattori, McLeland & Naughton

[57] ABSTRACT

A double effect absorption cold or hot water generating machine comprises an absorber A, a low temperature generator GL, a condenser C, a high temperature heat exchanger XH and a low temperature heat exchanger XL, a bypass circuit 20 having a cool/warm switching valve $V_1$ for directing refrigerant gas from a high temperature generator GH directly to an evaporator E, and a bypass circuit 21 having a cool/warm switching valve $V_2$ for directing refrigerant liquid from the evaporator directly to a diluted solution circulating system. A high head pump PH is disposed in the solution path between the absorber and the high temperature generator and a low head pump PL is disposed in the solution path between the absorber and the low temperature generator so that the high and low head pumps are driven during a cooling operation, and the high head pump is driven and the low head pump is stopped during a warming operation.

11 Claims, 2 Drawing Sheets

5,673,569

DOUBLE EFFECT ABSORPTION COLD OR HOT WATER GENERATING MACHINE

BACKGROUND OF THE INVENTION

1. Field of the Invention

The present invention relates to a double effect absorption cold or hot water generating machine, and more particularly, it relates to a double effect absorption cold or hot water generating machine which can be operated efficiently.

2. Prior Art

The double effect absorption refrigerating machine was developed to improve efficiency of the machine, and known is a machine which comprises a solution pump to supply a diluted solution to both of a high temperature generator and a low temperature generator as well as a machine comprises a high head pump used to supply a diluted solution to a high temperature generator and a low head pump used to supply the diluted solution to a low temperature generator, e.g. as disclosed in the JP-U-54-182458 (Japanese Utility Model Laid-open No. 182458/79).

However, in such double effect absorption refrigerating machines, it is not known to drive the machine in such a manner that, by providing a bypass circuit having a cool/warm switching mechanism, hot water for heaters can be supplied from loading piping disposed within an evaporator, in place of the supply of cooling cold water from the loading piping.

Further it is also not known how to operate the double effect absorption refrigerating machine with a cool/warm switching mechanism to save energy consumption thereof.

SUMMARY OF THE INVENTION (Problem which the Invention is to Solve)

An object of the present invention is to provide a double effect absorption cold or hot water generating machine which operates efficiently even when it is used for a warming operation.

The other object of the present invention is to reduce power consumption in a solution pump in a double effect absorption cold or hot water refrigerating machine.

(Means for Solving the Problem)

To solve the above-mentioned problem, according to the present invention, there is provided a double effect absorption cold or hot water generating machine comprising an absorber, an evaporator, a high temperature generator, a low temperature generator, a condenser, a high temperature heat exchanger and a low temperature heat exchanger, which are connected to each other through a solution circuit and a refrigerant circuit, and which further comprises a bypass circuit having a cool/warm switching mechanism for directing refrigerant gas from the high temperature generator directly to the evaporator, and a bypass circuit having a cool/warm switching mechanism for directing refrigerant liquid from the evaporator directly to a diluted solution circulating system, and wherein a high head pump is disposed in the solution path between the absorber and the high temperature generator and a low head pump is disposed in the solution path between the absorber and the low temperature generator so that the high and low head pumps are driven during a cooling operation, and the high head pump is driven and the low head pump is stopped during a warming operation.

During the warming operation, although the low head pump is normally stopped, it is sometimes desirable to drive the low head pump. If the low head pump is stopped all the way, since there is a danger that a corrosion inhibitor will become insufficient in a stopped area, the low head pump may be driven once or several times a day.

The cool/warm switching mechanism may be a cool/warm switching valve or a liquid seal pipe.

(Operation of the Invention)

In the double effect absorption cold or hot water generating machine according to the present invention, during the warming operation, since the solution system including the absorber, low temperature heat exchanger, low temperature generator and low head pump does not perform the special function, by adopting the arrangement in which the low head pump is stopped during the warming operation, power for driving the pump can be saved.

DETAILED DESCRIPTION OF THE PREFERRED EMBODIMENTS

The present invention will now be explained more specifically in connection with embodiments thereof with reference to the accompanying drawings. However, it should be noted that the present invention is not necessarily limited to these embodiments.

First of all, a first embodiment of the present invention will be explained.

Figure 1:
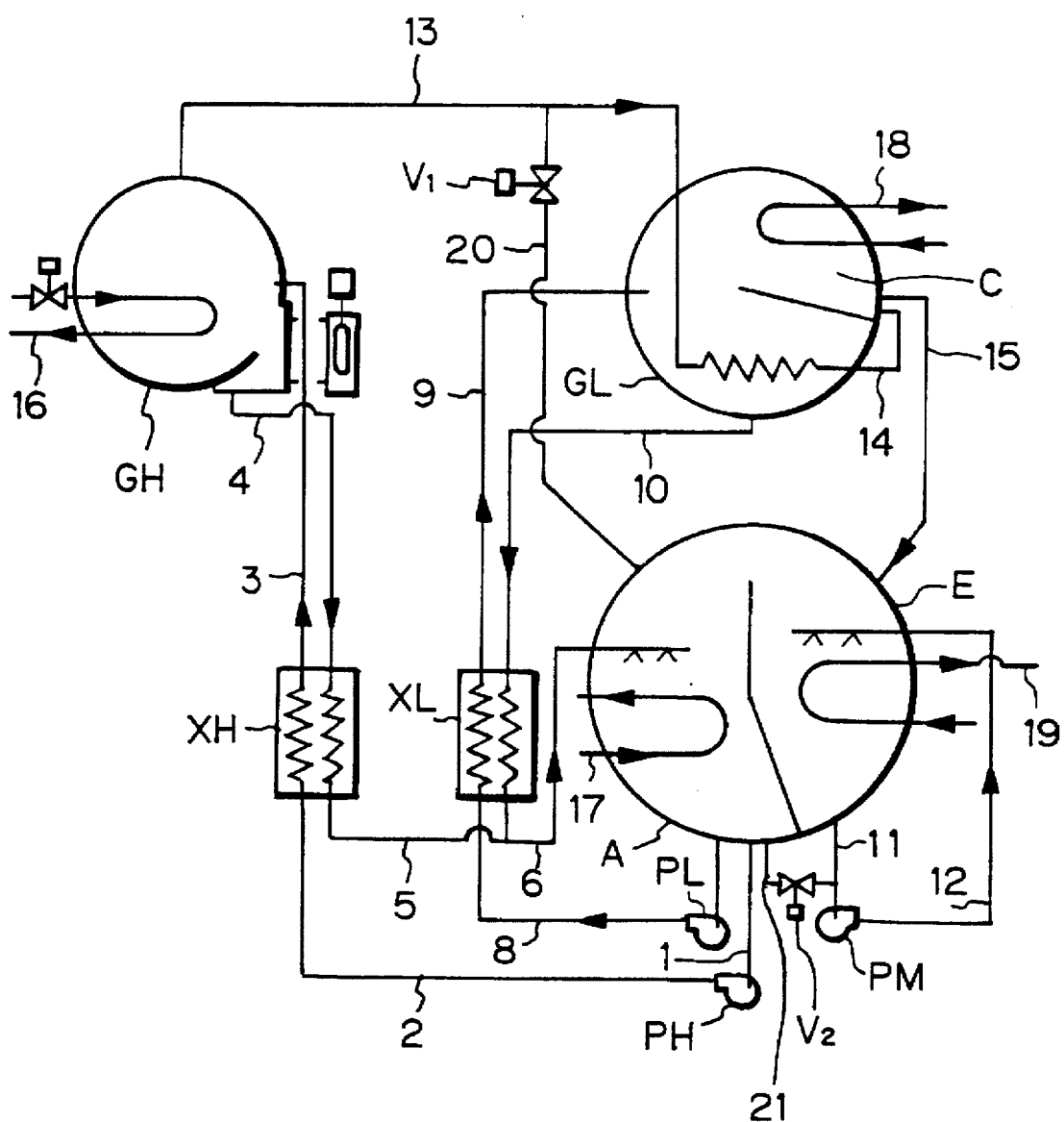
FIG. 1 is a hydraulic circuit of a double effect absorption cold or hot water generating machine according to a first embodiment of the present invention.

FIG. 1 shows a hydraulic circuit of a double effect absorption cold or hot water generating machine according to a first embodiment of the present invention.

In FIG. 1, the hydraulic circuit is constituted by an absorber A, a low temperature generator GL, a high temperature generator GH, a condenser C, an evaporator E, a low temperature heat exchanger XL, a high temperature heat exchanger XH, a low head pump PL for the low temperature generator, a high head pump PH for the high temperature generator, a refrigerant pump PM, solution circuits (paths) 1 to 10, refrigerant circuits (paths) 11 to 15, a heat source piping 16, cooling water pipings 17, 18, and a load piping 19 connected to any cooling load. Further, there are provided a bypass circuit 20 having a cool/warm switching valve $V_1$ for directing refrigerant gas (to be used in a warming operation) from the high temperature generator directly to the evaporator, and a bypass circuit 21 having a cool/warm switching valve $V_2$ for directing refrigerant liquid from the evaporator directly to a diluted solution circulating system.

In a cooling operation of the above-mentioned double effect absorption cold or hot water generating machine, a part of a diluted solution to which refrigerant gas is absorbed is directed from the absorber A to a heated side of the low temperature heat exchanger XL by means of the low head pump PL and then is introduced into the low temperature generator GL through the circuit (path) 9. In the low temperature generator GL, the diluted solution is heated and concentrated by the refrigerant gas from the high temperature generator GH, and then is sent to a heating side of the low temperature heat exchanger XL through the circuit (path) 10. Then, the solution is sent to the circuit (path) 6.

On the other hand, the remaining diluted solution from the absorber A is introduced into a heated side of the high temperature heat exchanger XH by means of the high head pump PH and then is introduced into the high temperature generator GH through the circuit (path) 3. In the high temperature generator GH, the solution is heated by heat source 16 to evaporate the refrigerant, thereby increasing the concentration of the diluted solution to form concentrated solution. The concentrated solution is sent, through the circuit (path) 4, to the high temperature heat exchanger XH, where heat exchange is effected, and then, the solution is mixed with the concentrated solution from the low temperature generator GL. The mixture is introduced into the absorber A through the circuit 6.

The refrigerant gas evaporated in the high temperature generator GH is passed through the refrigerant circuit (path) 13, where the refrigerant gas is used as a heat source for the low temperature generator GL and condensed. Then, the refrigerant is introduced into the condenser C. In the condenser C, the refrigerant gas which is generated in the low temperature generator GL is cooled and condensed by cooling water (in the cooling water piping 18), and then is introduced together with the heat source refrigerant passed through the low temperature generator GL into the evaporator E. In the evaporator E, the refrigerant liquid is circulated through the circuits (paths) 11, 12 by means of the refrigerant pump PM to be evaporated; meanwhile, heat generated by vaporization is removed from a loading side to further cool the cold water, which is used in the cooling operation.

The evaporated refrigerant is absorbed by the concentrated solution in the absorber A to form the diluted solution which is in turn circulated by means of the pump.

In such a cooling operation, as is in the conventional absorption refrigerating machine, the heat source 16 is adjusted on the basis of a cold water loading signal (or a cold water temperature signal).

Further, circulating amounts of the solution flowing through the high temperature generator GH and the low temperature generator GL are adjusted as follows. Although the diluted solution is concentrated to form the concentrated solution which is in turn introduced into the absorber, since the pressure in the high temperature generator is considerably greater than the pressure in the absorber, the pressure in the high temperature generator cannot be maintained by liquid seals (provided in the pipings) alone. Thus, for example, a solution level at an outlet of the high temperature generator is detected, and, the amount of the solution flowing into the high temperature generator is adjusted so that the solution level is maintained within a certain range.

When the pressure in the high temperature generator is changed, since the amount of solution flowing out of the high temperature generator is also changed to change the solution level, the flow-in amount of the solution to the high temperature generator is adjusted by detecting the change in the solution level.

Further, when the amount of the solution flowing into the low temperature generator is decreased, since the concentration of the solution at an outlet of the low temperature generator is increased (i.e. amount of the refrigerant included in the solution is decreased) to increase the boiling temperature of the refrigerant in the solution accordingly, the condensed temperature of the refrigerant gas (for heating the low temperature generator) from the high temperature generator is increased, with the result that the pressure in the high temperature generator is increased, thereby increasing the amount of the solution circulating through the high temperature generator.

To the contrary, when the amount of the solution flowing into the low temperature generator is increased, since the concentration of the solution at the outlet of the low temperature generator is decreased to decrease the boiling temperature of the refrigerant in the solution accordingly, the condensed temperature of the refrigerant gas (for heating the low temperature generator) from the high temperature generator is decreased, with the result that the pressure in the high temperature generator is decreased, thereby decreasing the amount of the solution circulating through the high temperature generator.

In this way, in dependence upon the flow-in amount of the solution to the low temperature generator, the pressure in the high temperature generator is changed, and, thus, the amount of the solution circulating through the high temperature generator is changed.

The amounts of the solution circulating through the high and low temperature generators are associated with the efficiency of the refrigerating machine. In general, the less the circulating amounts (i.e. the greater the concentration width) the greater the efficiency.

Since the amount of the solution circulating through the low temperature generator acts in an opposite (reverse) manner as the amount of the solution circulating through the high temperature generator and the amount of the solution circulating through the low temperature generator is preferential, the control of the amount of the solution circulating through the low temperature generator is important.

In the warming operation of the machine, the cool/warm switching valves $V_1$, $V_2$ are opened, so that the refrigerant gas from the high temperature generator is introduced into a cylindrical case constituting A/E (absorber/evaporator), thereby heating hot water passing through a tube 19 in the evaporator. In this case, the refrigerant gas condenses to form a drain (refrigerant liquid) which is in turn returned to the diluted solution circulating system through the valve $V_2$.

The solution system including the high temperature heat exchanger XH, high temperature generator GH and high head pump PH is in an operative condition. On the other hand, the solution system including the absorber A, low temperature heat exchanger XL, low temperature generator GL and low head pump PL is in an inoperative condition. Since the circuit including the low head pump does not perform the special function, by stopping the low head pump during the warming operation, the power for driving the pump can be saved.

In such a warming operation, the heat amount of the heat source is adjusted on the basis of a hot water load signal or a hot water temperature signal, as is in the conventional absorption cold or hot water generating machines.

Further, as is the case in the cooling operation, although the diluted solution is concentrated to form the concentrated solution which is in turn introduced into the absorber, since the pressure in the high temperature generator is considerably greater than the pressure in the absorber, the pressure in the high temperature generator cannot be maintained by liquids seals (provided in the pipings) alone. Thus, for example, a liquid level at an outlet of the high temperature generator is detected, and, the amount of the solution flowing into the high temperature generator is adjusted so that the liquid level is maintained within a certain range.

Next, a second embodiment of the present invention will be explained.

Figure 2:
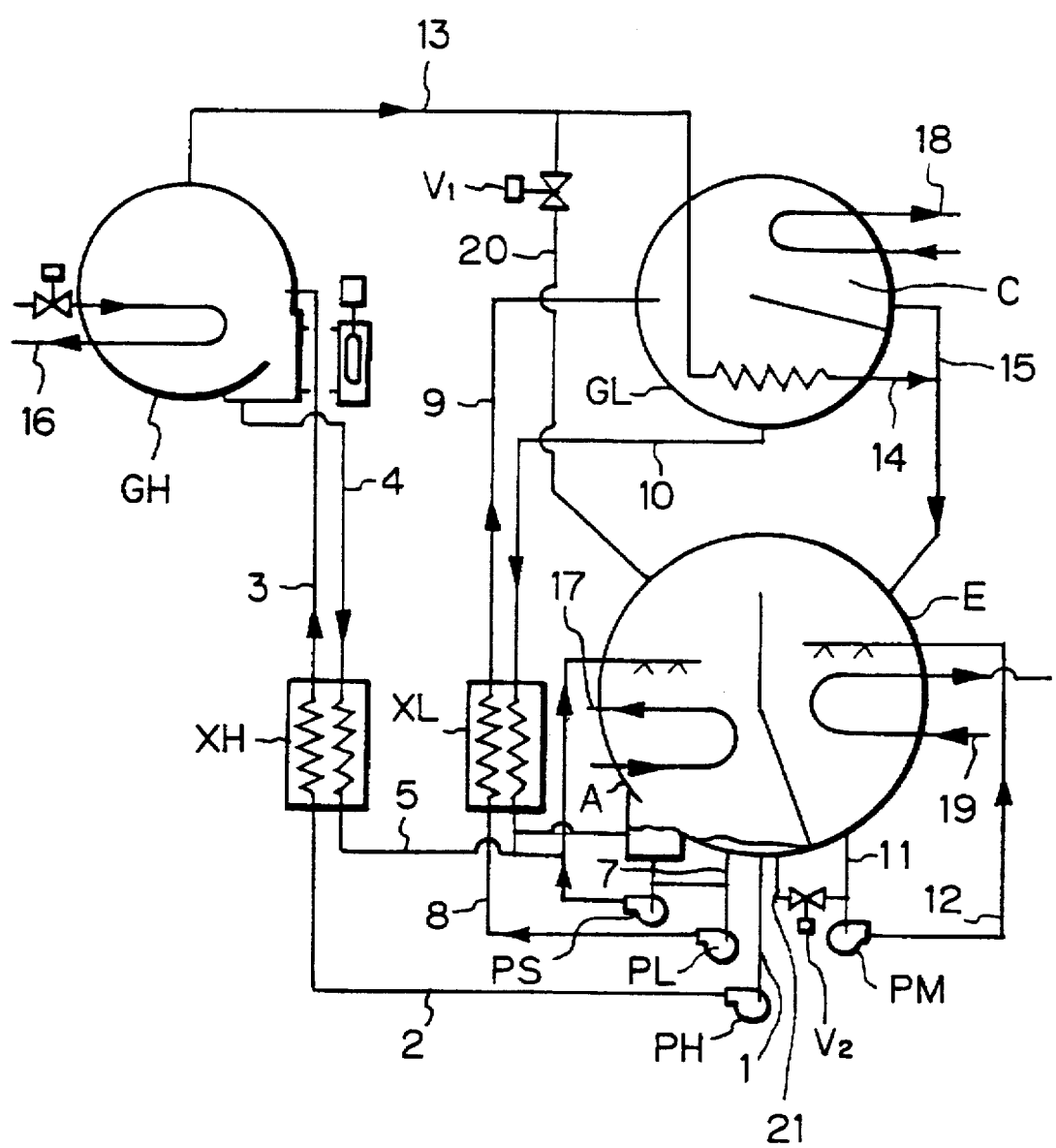
FIG. 2 is a hydraulic circuit of a double effect absorption cold or hot water generating machine according to a second embodiment of the present invention.

FIG. 2 shows a hydraulic circuit of a double effect absorption cold or hot water generating machine according to another embodiment of the present invention.

In the embodiment shown in FIG. 2, a solution spray pump PS is additionally provided in the concentrated solution circuit in front of the absorber A in the double effect absorption cold or hot water generating machine of FIG. 1. With this arrangement, the fundamental number of revolutions of the low head pump is determined on the basis of the heat amount of the heat source or cold water load (cold water temperature), and the amount of the solution circulating through the low temperature generator is limited or regulated by the pressure in the generator. The solution spray pump may be stopped during the warming operation.

(Effect of the Invention)

According to the present invention, the following advantages can be obtained:

(1) Since the low head pump is stopped during the warming operation, the power for driving the pumps in the double effect absorption cold or hot water generating machine can be saved.

(2) Since the driving time of the low head pump is reduced, the number of the maintenance operations of the low head pump (particularly, bearings thereof) can be reduced.

(3) The temperature of the solution at the outlet of the absorber is maintained below 50° C. in the cooling operation, but is increased to about 90° C. in the warming operation. Since a pump (canned pump) is operated under the high temperature (of the solution) in the warming operation, a heat-resistivity of a canned motor for driving the canned pump must be enhanced.

However, according to the present invention, since the low head pump is not driven during the warming operation, it is not required to enhance of the heat-resistivity of the low head pump, thereby permitting the use of a cheaper pump.

What is claimed is:

1. A double effect absorption cold or hot water generating machine comprising:

a high head pump disposed in a solution circuit between an absorber and a high temperature generator;

low head pump means, disposed in a solution circuit between said absorber and a low temperature generator for operating only during a cooling operation except in a predetermined case in a warming operation, and for directing diluted solution from said absorber to said low temperature generator through a low temperature heat exchanger;

a first bypass circuit having a first switching mechanism for directly directing refrigerant gas generated in said high temperature generator to an evaporator; and a second bypass circuit having a second switching mechanism for directly directing refrigerant liquid in said evaporator to a solution circulating system; and wherein during a cooling operation, the refrigerant gas generated in said high temperature generator is used as a heat source for said low temperature generator, diluted solution from said absorber being directed to said high temperature generator through said high head pump, concentrated solution from said high temperature being directed to said absorber through a high temperature heat exchanger, diluted solution from said absorber being directed to said low temperature generator through said low head pump means, concentrated solution from said low temperature generator being directed to said absorber through a low temperature heat exchanger, and refrigerant gas generated in said low temperature generator being cooled by a condenser to form refrigerant liquid which is in turn evaporated by said evaporator, thereby cooling water in a loading piping disposed in said evaporator; and during a warming operation, said low head pump means is stopped except for a predetermined case, the refrigerant gas generated in said high temperature generator being directly directed to said evaporator through said first bypass circuit, refrigerant liquid in said evaporator being directly directed to said solution circulating system through said second bypass circuit, so that the water in said load piping disposed in said evaporator is heated.

2. A double effect absorption cold or hot water generating machine according to claim 1, wherein said predetermined case is a predetermined time period which continues when a temperature of the solution is lower than a predetermined temperature.

3. A double effect absorption cold or hot water generating machine according to claim 1, further comprising a solution spray pump means for supplying the concentrated solution to said absorber, and wherein said solution spray pump is driven during the cooling operation and is stopped during the warming operation.

4. A method for operating a double effect absorption cold or hot water generating machine, said machine including high head pump disposed in a solution circuit between an absorber and a high temperature generator, a low head pump disposed in a solution circuit between said absorber and a low temperature generator, a first bypass circuit having a first switching mechanism for directly directing refrigerant gas generated in said high temperature generator to an evaporator, and a second bypass circuit having a second switching mechanism for directly directing refrigerant liquid in said evaporator to a solution circulating system, said method comprising:

a cooling operation wherein water in a load piping disposed in said evaporator is cooled, and a warming operation wherein water in said load piping disposed in said evaporator is warmed, said cooling operation including the steps of (a) using refrigerant gas generated in said high temperature generator as a heat source for said low temperature generator, (b) directing diluted solution from said absorber to said high temperature generator through said high head pump, (c) directing concentrated solution from said high temperature generator to said absorber through said high temperature heat exchanger, (d) directing diluted solution from said absorber to said low temperature generator through said low head pump, (e) directing concentrated solution from said low temperature generator to said absorber through said low temperature heat exchanger, (f) cooling the refrigerant gas generated in said low temperature generator by said condenser to form the refrigerant liquid, and (g) evaporating the refrigerant liquid in said evaporator, said warming operation including the steps of (h) stopping said low head pump except for a predetermined case, (i) directing the refrigerant gas generated in said high temperature generator directly to said evaporator through said first bypass circuit, and (j) directing the refrigerant liquid in said evaporator directly to said solution circulating system through said second bypass circuit so that the water in said load piping disposed in said evaporator is heated.

5. A method according to claim 1, wherein step (b) includes operating said low head pump only for a predetermined time during said warming operation when a temperature of the solution is lower than a predetermined temperature.

6. A method according to claim 1, wherein said cooling operation includes a step of operating a solution spray pump for supplying the concentrated solution to said absorber, and wherein said warming operating includes the steps of stopping said solution spray pump.

7. A machine comprising:

an absorber;

a high temperature generator;

a low temperature generator;

a high head pump means, disposed in a solution circuit between said absorber and said high temperature generator, pumping solution from said absorber to said high temperature generator during a cooling operation and a warming operation; and low head pump means, disposed in a solution circuit between said absorber and said low temperature generator, being inoperative for at least part of the warming operation, and pumping solution from said absorber to sad low temperature generator during the cooling operation.

8. The machine of claim 7, wherein said low head pump means is inoperative during the entire warming operation except for a predetermined time when a temperature of the solution is lower than a predetermined temperature.

9. The machine of claim 7, further comprising:

a high temperature heat exchanger disposed in a solution circuit between said absorber and said high temperature generator; and a low temperature heat exchanger disposed in a solution circuit between said absorber and said low temperature generator.

10. The machine of claim 7, further comprising:

spray pump means for supplying a concentrated solution to said absorber only during the cooling operation and being inoperative during the warming operation.

11. The machine of claim 7, further comprising:

bypass means for directing a refrigerant liquid from an evaporator to a diluted solution circulating system at least during the warming operation; and a refrigerant pump, for directing the refrigerant liquid from the evaporator to the diluted solution circulating system only during the cooling operation and being inoperative during the warming operation.

\* \* \* \* \*